Patented Aug. 12, 1952

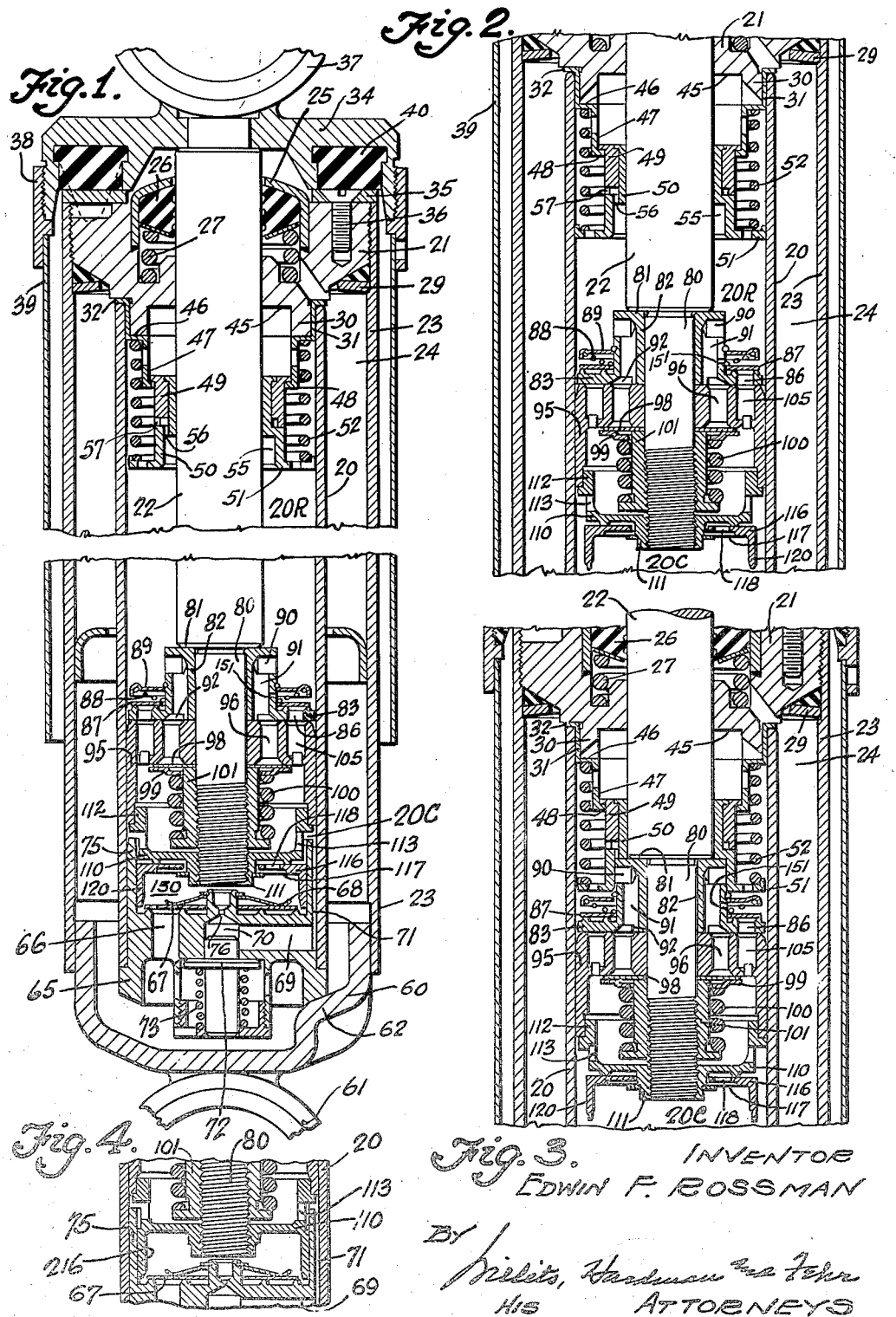

2,606,630

UNITED STATES PATENT OFFICE 2,606,630

SHOCK ABSORBER

Edwin F. Rossman, Dayton, Ohio, assignor to General Motors Corporation, Detroit, Mich., a corporation of Delaware Application June 3, 1950, Serial No. 165,980

16 Claims. (Cl. 188—88)

1

This invention relates to improvements in hydraulic shock absorbers and particularly to the two way, direct acting type of shock absorbers.

It is among the objects of the present invention to provide a hydraulic shock absorber adapted to control both the approaching and separating movements of two relatively movable members such as the frame and axle of a vehicle. The shock absorber is particularly adapted to provide the necessary resistance to movements in either direction from its dead center or normal load position, and comparatively higher resistance while moving through a predetermined final portion of its range of movement in either direction.

A further object of the invention is to provide a hydraulic shock absorber having "compression" or approaching and "rebound" or separating movements, said shock absorber during its "compression stroke" from normal load position providing the desired resistance to movements for a predetermined portion of such stroke and then a comparatively higher resistance for the remaining and final portion of its compression stroke. When moving from normal load position through its rebound stroke, the shock absorber provides the necessary resistance to movement through a predetermined portion of this stroke and then through the final remaining portion of the rebound stroke it provides an increased resistance. This increased resistance may not necessarily be equal to the resistance offered during the final stage of the compression stroke.

Further objects and advantages of the present invention will be apparent from the following description, reference being had to the accompanying drawing, wherein a preferred embodiment of the present invention is clearly shown.

In the drawing:

Fig. 1 is a broken longitudinal sectional view of a shock absorber constructed in accordance with the present invention, the piston being shown in its extreme "compression stroke" position.

Fig. 2 is a fragmentary sectional view showing the piston in the "normal load" or intermediate position.

Fig. 3 is a fragmentary sectional view showing the shock absorber piston in the position in which it is starting the final portion of its "rebound stroke" movement during which increase resistance is provided.

Fig. 4 is a fragmentary sectional view of a modified form of control mechanism.

2

Referring to the drawings, the working cylinder of the shock absorber is designated by numeral 20, this cylinder being provided with end closure members, the one designated by the numeral 21 being located at the upper or rebound end of the cylinder 20. This end closure member 21 has a central aperture providing a bearing and guide member for the piston rod 22. The larger diameter portion of the end closure member 21 is exteriorly threaded to be received by the interiorly threaded end of the reservoir tube 23 surrounding the working cylinder 20 and providing the annular space or reservoir 24 about the cylinder 20. The outer end of the closure member 21 is recessed for receiving a centrally apertured cup 25 which contains a resilient packing 26 urged into sealing engagement with the retainer cup 25 and the surface of the piston rod 22 extending through the packing by a spring 27 interposed between the end closure 21 and a metallic facing on the packing 26. A suitable sealing mechanism 29 is provided in the reservoir space 24 and engages the tube 23 and the closure member 21 to seal their line of contact against fluid leaks. The end closure member 21 has an annular extension 30 which projects into the end of the cylinder 20. Surrounding this extension 30 is one portion of a retainer collar 31 having an outwardly extending flange 32. This collar 31 fits snugly about the extension 30 of the end closure member and also into the cylinder 20, the flange 32 being engaged by the outer end of the cylinder and held tightly against the closure member by said cylinder.

An abutment ring plate 35 is secured to the outer end of the closure member 21 by screws 36. The outer end of the piston rod 22 extending outside the shock absorber has a disc 34 secured thereto and a mounting ring 37 by means of which this end of the shock absorber may be attached to one of the two relatively movable members whose movement the shock absorber is adapted to control. When installed on a motor vehicle this mounting ring 37 is usually secured to the frame of the vehicle. Disc 34 is exteriorly threaded to receive a ring 38 to which the dust cover tube 39, surrounding the reservoir tube 23, is attached in any suitable manner. Inside the disc 34 there is secured a resilient bumper ring 40 which is adapted to engage the plate 35 while the shock absorber is moved toward the final extremity of its compression stroke. The dotted lines on the left side of Fig. 1 shows the normal shape of this bumper ring when not engaging the abutment plate 35, the right side portion of the ring 40 in Fig. 1 showing its shape when engaging and compressed against the abutment ring 35 as piston reaches its extreme end of the compression stroke. This bumper ring 40 prevents damaging by bottoming of the piston upon the lower cylinder closure member which may happen under extreme conditions.

The inner end of the annular extension 30 of the end closure member 21 is recessed as at 45. The flanged collar 31 has an inwardly extending flange 46 which rests against the inner end of the extension 30, another smaller diameter cylindrical portion 47 of said collar forming a cylinder equal in diameter of the recess 45. This tubular portion 47 of the collar has an inwardly extending annular flange 48 providing an abutment stop engaged by an outwardly extending flange on a collar 49, which collar surrounds and is secured to a sleeve 50, one portion of which slidably engages the piston rod 22. Sleeve 50 has an outwardly extending flange 51 forming an abutment for one end of a spring 52 the other end of the spring resting against the flange portion 46 of the collar 31. This construction provides a telescoping mechanism supported upon the end closure member 21 by the cylinder 20. The collar 49 and sleeve 50 attached together may move slidably relatively to the collar 31 against the effect of the spring 52 to hold them in extended position as shown in Fig. 1. Sleeve 50 with its collar 49 may move inwardly of the collar 31 and the recess 45 in end closure member 21 until the inner ends of the sleeve 50 and its attached collar 49 engage the bottom or inner surface of the recess 45. The sleeve 50 is so constructed as to provide a recess 55 in its outer end. This recess is vented by openings 56 in the bottom of the recess which communicate with an annular groove in the collar 49. Openings 57 in collar 49 communicate with the annular groove. Thus any fluid which may be trapped within the recess 50 as will later be described may be exhausted through the fluid passage consisting of openings 56, annular groove in collar 49 and openings 57.

The lower end of the reservoir tube 23 has a closure cap 60 secured thereto in any suitable manner. A mounting ring 61 is provided by this cap, this mounting ring being secured to the axle of the vehicle when the shock absorber is installed thereupon. End closure cap 60 has spaced dents providing abutment areas or sections 62 upon which the end closure member 65 rests. This end closure member 65 telescopically fits into the lower end of the work cylinder 20 which may be termed the compression end of this cylinder, compression end meaning that in operation as the piston moves toward this end of the cylinder, the springs of the vehicle upon which the shock absorber is assembled are moving on their compression stroke, the other end of the cylinder is termed the rebound end for as the piston moves toward the upper end of the cylinder, the vehicle springs are rebounding and causing a separation between the frame and axle of the vehicle to which the shock absorber is attached.

For purposes of this description, the cylinder chamber between the piston and the end closure member 21 may be referred to as the rebound control chamber 20R while the chamber in the cylinder between the piston and the end closure member 65 may be termed the compression control chamber 20C. The end closure member 65 has a plurality of valved passages providing controlled communication between the cylinder chamber 20C and the reservoir 24. One group of these passages designated by the numeral 66 is normally closed by a valve 67 urged upon annular ridge or valve seats on the inner or cylindrical side of the closure member 65 by a comparatively light spring 68. This valve 67 may be termed the intake or replenishing valve.

Radial passages 69 connect a central passage 70 with longitudinal channels 71 in the face of the closure member engaging the cylinder 20, so that chamber 20C is in communication with the passage 70 through the longitudinal channels or grooves 71 and the radial passages 69. A pressure relief valve 72 is urged normally to close passage 70 by a spring 73, said valve 72 however being movable by a predetermined fluid pressure in passages 69 to open communication between the central passage 70 and the space in the end closure cup 62 beneath said end closure member 65 which space is in constant communication with the reservoir 24 as shown in Fig. 1 on the left hand side, the right hand side portion of the section showing the end closure member 65 resting upon one of the abutment lugs 62.

The closure member 65 has a cylinder extension 75 fitting and extending into the cylinder, said extension being of a predetermined length and interior diameter which is predeterminately less than the interior diameter of the cylinder 20. Thus the cylinder extension 75 provides a reduced diameter portion of a predetermined length at the bottom or compression end of the working cylinder 20. An orifice 76 of predetermined fluid flow capacity so as to provide the desired restriction to fluid flow therethrough, connects the central passage 70 containing the valve 72 with the interior of the cylinder chamber 20C.

As has previously been stated, the piston rod 22 extends from the exterior of the shock absorber slidably through the rod guide on the end closure 21 and through the sleeve 50 into the interior of the cylinder chamber 20R. This piston rod has a reduced diameter portion 80 thus forming a shoulder 81 on said rod, the outer end portion of said reduced diameter portion 80 being exteriorly threaded. A collar 82 fits upon the rod portion 80 and abuts against the shoulder 81 thereon. This collar has an outwardly extending flange 83, the surface of which facing the cylinder chamber 20R being provided with two spaced and concentric annular ridges between which holes 86 are provided in spaced relation, these holes forming fluid passages through this annular flange which forms the seat for the compression control valve 87 which is a ring-shaped disc fitting loosely about the collar 82 and which is yieldably urged to rest upon the annular ridges or valve seats on flange 83 to close the openings 86, by means of a spring 88 interposed between said disc valve 87 and an abutment ring 89 secured to the collar 82 in any suitable manner. A plurality of radial openings 90 each communicate with a passage 91, these passages terminating in an annular groove 92 provided in the face of the collar 82 adjacent the main body portion of the piston 95. This main body portion of the piston is centrally apertured to fit over the piston rod portion 80, the upper end of the piston abutting against the flanged end of the collar 82. Piston 95 has a plurality of through passages in its body portion, one group being arranged in an outer circular row, the other in an inner circular row. The inner row of passages designated by the numeral 96 communicate with the annular groove 92 in the valve seat collar or member 82. The opposite ends of this group of openings 96 are normally closed by a resilient ring-shaped disc valve 98 which may consist of one or a plurality of resilient sheet metal discs urged normally to engage the piston body by an abutment collar 99 which is pressed against the disc valve 98 by a spring 100 interposed between the abutment ring 99 and a collar 101 threaded upon the rod portion 80. The inner end of collar 101 engages the disc valve 98 and presses it against the piston 95, the piston against the valve seat collar or member 82 and the latter against the annular shoulder 81 on the piston 22. Thus all these portions of the piston are tightly clamped and held in position on the piston rod. The disc valve 98 yieldably maintained upon the piston by spring 100 thus normally closes the exit ends of the passages 96, all of which are in communication with respective passages 91 and radial openings 90 in the collar 82.

Piston 95, as has previously been mentioned, has another group of passages 105 arranged in an outer annular row about passages 96, each of the passages 105 communicating with a cooperating passage 86 in the flange 83 of the collar 82. The discharge ends of the passages 105—86 are closed by the disc valve 87 yieldably urged upon its seat by the spring 88. Thus passages 86 and 105 provide for the transfer of fluid from one side of the piston to the other or from the chamber 20C to chamber 20R of the working cylinder in response to reciprocation of the piston downwardly, passages 96 and their respective valve 99 becoming active to transfer fluid from chamber 20R to chamber 20C as the piston moves upwardly on its rebound stroke toward the end closure member 21, and the passages 105 and their control valves 87 becoming active when the piston moves downwardly on its compression stroke or toward the member 65.

The main body portion of the piston 95 is not only secured to the piston rod by the clamping screw collar 101 but it is also supported on said rod by a flanged disc 110 which has a hub 111 threaded upon the reduced diameter portion 80 of the rod and having an annular outer flange 112 which extends and snugly fits into the end of the skirt portion of the piston 95. A series of openings 113 are provided in the annular flange 112. The outside diameter of a part of the annular flange 112 is predeterminedly less than the inside diameter of the cylindrical extension 75 on the end closure member 65, thus when said member 110 is moved into the cylindrical extension 75 on the compression stroke of the shock absorber as shown in Fig. 1, a predetermined clearance space is provided between the contiguous surfaces of the element 110 and the tubular extension 75. On the outer end surface of element 110, or more particularly to that surface exposed to the compression chamber 20C of the work cylinder, there is provided an annular ridge forming a seat for the valve 116. This valve is yieldably urged normally to engage disc 110 by a spider spring 117 anchored to the hub portion 111 of the element 110 and therefore to the piston rod portion 80. A series of openings 118 are provided in the valve member 116 within the confines of the annular valve seat on disc 110 and normally engaged by valve 116.

Valve member 116 has depending cylindrical flange 120 having an outside diameter so that said flange 120 will slidably fit and enter the cylindrical extension 75 on the closure member 65 as shown in Fig. 1. When the piston is at the extreme compression stroke position, as shown in Fig. 1, the openings 113 are not completely covered by the cylindrical extension 75; thus at no time are these openings closed.

As stated in the objects of the invention, the present shock absorber is designed so that as the piston 95 is reciprocated in either direction from its intermediate or normal load position as shown in Fig. 2, a normal resistance to the flow of fluid within the shock absorber and therefore a normal resistance by the shock absorber to the movements of the two relatively movable members between which it is connected is provided. This normal resistance exists only for a predetermined portion of each stroke, that is, for a predetermined portion of the upward or rebound stroke or the downward or compression stroke of the piston.

As further stated in the objects of the invention, as the piston moves through a predetermined final portion of each stroke, the restriction to fluid flow is increased and thus the resistance offered by the shock absorber is correspondingly increased.

During operation of a vehicle over a comparatively smooth roadbed, the shock absorber is maintained so that its piston moves within the intermediate or normal load zone. When the road wheels of the vehicle strike an obstruction in the roadbed, the axle is thrust upwardly and therefore the portions of the shock absorber secured to the end closure cup 62 move upwardly. This results in a downward movement of the piston 95 within the cylinder 20 or a movement of the piston through its compression stroke thereby exerting pressure upon the fluid within the working chamber 20C of the shock absorber. The fluid pressure within the chamber 20C acting through the openings 113 in the supporting disc 110, the interior of the piston 95 and through the passages 105—86 of the piston will move valve 87 from its seat to establish a controlled transfer of fluid from chamber 20C to the chamber 20R, the valve 87 providing a certain restriction to this transfer of fluid and thus causing the shock absorber to offer a certain relative resistance to approaching movements of the elements between which the shock absorber is connected. Chamber 20R, being occupied by the piston rod 22, will not be able to receive all of the fluid displaced in chamber 20C by the piston and consequently fluid displaced by the piston rod 22 will exert pressure through the channel 71 in the end closure member 65, radial passage 69 and central passage 70 against the valve 72 which at a predetermined fluid pressure in passage 70 will be moved to establish a restricted fluid flow from chamber 70 past the valve 72 into the space within the end closure cap 62 and into the reservoir 24. While the piston moves from its intermediate or normal load position on its compression stroke to the point at which the annular flange portion 120 on the piston enters the cylindrical extension 75. the normal fluid flow restriction and consequently normal resistance by the shock absorber to movement will obtain. However, as soon as the tubular extension 120 on the element 116 carried by piston 95 enters the cylindrical extension 75 on the closure member 65, fluid in the chamber 150 formed by the flanged member 116 and the cylindrical extension 75 will be trapped therein, its only means of egress from said fluid trapping chamber 150 being through the orifice 76. Now while the piston is moving downwardly to slide element 116 from its entrance position into the cylindrical extension 75 to the extreme position as shown in Fig. 1, fluid in the trapping chamber 150 is being forced through the orifice 76 into the central chamber 70 from whence one portion, substantially equal to the fluid portion displaced by the rod, passes valve 72 on its way to the reservoir. The remaining portion of the fluid in chamber 70 flows through radial passages 69 and channels 71 into chamber 20C from whence it, plus the amount of fluid displaced by the surplus area of piston 95 over member 116 passes through 113, 105, 86 and by valve 87 to fill the void in the expanding chamber 20R. Any damaging bottoming of the annular flange portion 120 of element 116 upon the closure member 65 is avoided by the action of the rubber or resilient bumper 40 engaging the plate 35 and being compressed during this final movement of the piston and its associated parts.

After completion of the compression stroke of the shock absorber, the springs on the vehicle will actuate the frame and axle of the vehicle with which the shock absorber is connected thereby causing said frame and axle to separate and operate the shock absorber through its rebound stroke. In moving from the extreme position as shown in Fig. 1, the piston 95, moving upwardly, will exert a pressure upon the fluid in chamber 20R, causing said fluid to pass through radial openings 90, communicating passages 91 and 96, operating the valve 98 to move from its seat and permit fluid flow through the piston and out through the side openings 113 into the expanding cylinder chamber 20C. Chamber 20C is divided into two parts by the element 116 movable with and also relative to said piston 95. The differential volume 20C minus that of chamber 150 beneath 116, increases at too low a rate, as the piston 95 moves upwardly to absorb all of the fluid flow from chamber 20R in response to this piston movement. Thus the pressure in chamber 20C, above the element 116, is correspondingly increased and, being directed against element 116, moves it from engagement with the piston against the effect of the comparatively light spring 117 to establish a flow through openings 118 in element 116 and into the expanding chamber 150. Since this fluid flow is not sufficient to satisfy or fill chamber 150, the pressure in chamber 150 is decreased below that in the reservoir 24 resulting in a compensating flow from the reservoir through passages 66 past valve 67 into said chamber 150. This compensating flow is maintained until the annular flange or skirt 120 moves out of the confines of the cylindrical extension 75 of closure member 65 after which the fluid trapping chamber 150 is eliminated and the entire space beneath the piston becomes the cylinder chamber 20C whose fluid supply is replenished by the reservoir through passages 66 and past valve 67 as the piston continues on its rebound stroke.

Normal restriction to fluid flow as offered by valve 98 will be maintained until the piston has moved through its rebound stroke so that the collar 82 enters into the recess 55 provided by element 50, at which time radial openings 90 are closed completely by said element 50 and thus the entrance ends of communicating passages 90—91—96 leading to valve 98 are completely shut off while the piston moves through the predetermined final range of movement or its rebound stroke governed by the telescoping of the member 50 into the member 31 and recess 45 in the end closure member 21 against the effect of spring 52. During this final range of rebound movement of the piston and while the entrance openings of passages 90 are closed, the orifice 151 in the collar 82 will become effective, said orifice providing communication between the chamber 20R and a passage 91 of said group of passages. Orifice 151 is constantly open for it is beyond the control of the element 50 into which this piston portion extends during this time. The orifice 151 is of predetermined size and offers a substantially high restriction to fluid flow, it being the only communication between chamber 20R and chamber 20C as the piston moves through this final predetermined range of its rebound stroke. This high restriction to fluid flow thus causes the shock absorber to offer comparatively high resistance to the approaching movements of the members between which it is connected.

In installations on certain vehicles it may be desirable to increase shock absorber resistance immediately upon the start of the piston rebound stroke movement from its extreme compression stroke position. Fig. 1 shows the piston in this extreme position. Fig. 4 shows one construction which will provide such increased resistance. Here the aforedescribed element 116, instead of being a movable valve carried by the piston and receivable by the cylindrical extension 75, is a piston 216, integral with the flanged disc 110 and receivable by the cylindrical extension 75 of the closure member 65. With this construction fluid displaced from chamber 20R in response to upward movement of the piston 95, must all flow through openings 113, channels 71, passages 69 and pass the fluid flow restricting valve 72 on its way to the reservoir until piston 216 leaves the confines of cylindrical extension 75 at which time chamber 150 becomes a part of chamber 20C and a compensating fluid flow is established into chamber 20C from the reservoir 24 through passages 66, past valve 67, at which time valve 72 is rendered inactive due to the inability of the rod containing chamber 20R to satisfy or completely fill chamber 20R as the piston moves upwardy. While the piston 216 is being moved out of cylinder 75, valve 67 will be open to permit fluid from the reservoir 24 to flow into chamber 150 which is completely isolated from chamber 20C during this time excepting the through orifice 76, passages 70, 69 and channels 71, which will not be appreciably effective because valve 72 is of considerably lesser fluid restriction than orifice 76 and thus the effective flow passes valve 72.

The aforegoing description clearly discloses that the present shock absorber is capable of providing a control of varying degree to approaching and separating movements of the frame and axle of a vehicle between which the shock absorber is connected. As said frame and axle move within a predetermined intermediate range of movements, the resistance offered by the shock absorber is normal. However, when the approaching or separating movements of the frame and axle of the vehicle reach predetermined extreme zones, the shock absorber is constructed to provide increased resistance to such body and axle movements. These final resistances to movements by the shock absorber being comparatively greater than any resistance offered during movements thereof in its intermediate zone.

While the embodiment of the present invention as herein disclosed, constitutes a preferred form, it is to be understood that other forms might be adopted.

What is claimed is as follows:

1. A hydraulic shock absorber comprising in combination, a cylinder having end closure members, a piston in said cylinder, having valved passages providing for the controlled transfer of fluid from one side of the piston to the other as the piston is reciprocated in the cylinder, means movably carried by one closure member, said means being operative, as the piston moves through a predetermined final range of movement toward said one closure member, completely to close the entrance ends of those passages active during the approaching movement of the piston toward said final range, a fluid flow restricting orifice in the piston beyond the effective control of said means, said orifice providing a constant fluid by-pass into one of the passages between said closing means and the valve for said passage, and oppositely acting fluid flow controlling valves in the other closure member, providing communication between the cylinder and a fluid reservoir.

2. A hydraulic shock absorber comprising in combination, a cylinder having end closure members, a piston in said cylinder, having valved passages providing for the controlled transfer of fluid from one side of the piston to the other as the piston is reciprocated in the cylinder, a receptacle yieldably supported upon one closure member, said receptacle being adapted to receive a piston extension provided with passages communicating with those passages in the piston through which fluid flows as the piston moves toward said one closure member, entrance of said extension into the receptacle, as the piston moves through a predetermined final range of movement toward the said one closure member, completely closing the fluid entrance ends of said extension passages, a fluid flow restricting orifice in the extension beyond the reach of the receptacle, said orifice leading into one of the passages in the extension, a fluid reservoir, and oppositely acting valved passages in the other closure member connecting the cylinder and reservoir.

3. A hydraulic shock absorber comprising in combination, a cylinder having end closure members, a piston in the cylinder having a rod extending through one closure member, a plurality of valved passages in the piston providing for the controlled transfer of fluid from one side of the piston to the other as said piston is reciprocated in the cylinder, means for increasing the restriction to the fluid flow through the piston as it reaches a predetermined point in its approach toward the said one closure member, said means comprising a cup-shaped element slidably supported upon the piston rod and engaging a tubular portion on the closure member through which the rod extends, a spring yieldably urging said cup-shaped element into predetermined normal position relatively to said closure member, an extension on the piston having passages communicating with one group of valved passages in the piston, said extension being receivable by the cup-shaped element to closure the entrance ends of the passages in said extension as the piston moves through the predetermined final range of movement toward the element supporting closure member, an orifice in said extension beyond the reach of the cup-shaped element, said orifice opening into a passage of said one group of passages, a fluid reservoir, and valved passages in the other cylinder closure member, operative to control fluid flow between the reservoir and cylinder in opposite directions.

4. A shock absorber in accordance with claim 3, in which, however, the means for increasing the restriction to the fluid flow through the piston as it moves through a final range of movement toward the said one closure member, consists of telescopically engaging collars having a limited separating movement and normally held in the extreme separated position by a spring interposed between said collars, the one collar being secured to the said one closure member, the other collar slidably fitting about the piston rod and having a recess for receiving the piston extension for closing certain passages therein while the piston moves to telescope one collar into the other.

5. A hydraulic shock absorber comprising in combination, a cylinder having end closure members, one of which is orificed to communicate with a fluid reservoir, fluid displacement means in said cylinder comprising a piston having a plurality of fluid transfer passages and a rod for reciprocating it, said rod extending through the other closure member, a fluid flow controlling valve yieldably urged upon each end of the piston, each valve normally, yieldably closing one end of a group of said passages, yieldably expanded, telescoping means carried by the said other closure member and slidably fitting the piston rod, said means being operative to receive a portion of the piston and close the group of passages normally active as the piston moves toward said means, an orifice in the piston constantly free of said means and communicating with one of said closed passages for establishing a restricted fluid flow through the piston as it moves to contact said telescoping means, and means for controlling fluid flow through the orificed closure member into and from the reservoir.

6. A hydraulic shock absorber comprising in combination, a cylinder provided with end closure members, a piston in the cylinder having a plurality of valved passages for controlling the transfer of fluid through the piston in both directions in response to reciprocation thereof, said piston having an actuating rod extending through one closure member, a fluid reservoir, valved passages in the other closure member, operative predeterminately to control the transfer of fluid in opposite directions, respectively, between the cylinder and reservoir; a cylindrical extension of predetermined length on said other closure member, fitting into the cylinder and of predeterminately lesser inside diameter than the cylinder, means supported by the piston and operative slidably to fit into said cylindrical extension and form a fluid trapping chamber therein when the piston has been moved through a predetermined range toward said other closure member, and a fluid restricting orifice in said other closure member connecting said trapping chamber with the valved passage operative to deliver fluid from the cylinder to the reservoir.

7. A hydraulic shock absorber comprising in combination, a cylinder provided with end closure members, a piston in the cylinder having a plurality of valved passages for controlling the transfer of fluid through the piston in both directions in response to reciprocation thereof, said piston having an actuating rod extending through one closure member, a fluid reservoir, valved passages in the other closure member, operative predeterminately to control the transfer of fluid in opposite directions, respectively, between the cylinder and reservoir, a cylindrical extension of predetermined length on said other closure member, fitting into the cylinder and of predeterminately lesser inside diameter than the cylinder, means supported by the piston and operative slidably to fit into said cylindrical extension and cooperate therewith to form a fluid trapping chamber during a predetermined final range of piston movement toward said other closure member, and an orifice of predetermined fluid flow restriction providing communication between said chamber and the reservoir.

8. A hydraulic shock absorber comprising in combination, a cylinder provided with end closure members, a piston in the cylinder having a plurality of valved passages for controlling the transfer of fluid through the piston in both directions in response to reciprocation thereof, said piston having an actuating rod extending through one closure member, a fluid reservoir, valved passages in the other closure member, operative predeterminately to control the transfer of fluid in opposite directions, respectively, between the cylinder and reservoir, a cylindrical extension of predetermined length on said other closure member, fitting into the cylinder and of predeterminately lesser inside diameter than the cylinder, means supported by the piston and operative slidably to fit into said cylindrical extension and cooperate therewith to form a fluid trapping chamber, the valved passage for directing fluid from the reservoir into the cylinder, opening into said chamber and the valved passage for directing fluid from the cylinder to the reservoir being in communication with said chamber through a constantly open, fluid flow restricting orifice in said other closure member.

9. A hydraulic shock absorber in accordance with claim 6, in which, however, the means supported by the piston and operative slidably to fit into said cylindrical extension and form a fluid trapping chamber therein, is a disc valve yieldably urged against the end of the piston and operative to move away from said piston and establish a fluid flow through the piston and into said chamber in response to movement of the piston to withdraw said valve means from the cylindrical extension on said other closure member.

10. A hydraulic shock absorber comprising in combination, a cylinder having end closure members, a fluid reservoir, a cylindrical extension on one of said closure members fitting into the cylinder and having longitudinal channels in its outer peripheral surface; a discharge passage in said one closure member communicating with the said channels and the reservoir, normally closed by a spring loaded valve operative at a predetermined fluid pressure to permit fluid to flow at a predetermined restricted rate from the cylinder through the channels and passage into the reservoir, other fluid passages in said one closure member connecting the reservoir with the annular space defined by the cylindrical extension and normally closed by a spring loaded valve, operative to establish a substantially unrestricted fluid flow from the reservoir into the cylinder, an orifice in the one closure member providing a constantly restricted communication between the cylinder and the discharge passage, a rod slidably extending through the other end closure member into the cylinder, a piston in the cylinder, said piston comprising a main body portion carried by the rod and a clamping disc threaded to the rod and engaging the body portion to hold it in position on said rod, the disc having a cylindrical wall portion provided with openings and being of lesser diameter than the inside diameter of the cylindrical extension on the one closure member, the body portion of the piston having valved passages providing for controlled transfer of fluid from one side of the piston to the other in response to reciprocation of the piston, and a disc valve yieldably urged against the clamping disc, said disc valve having an annular flange adapted slidably to be received by the said cylindrical extension on the one closure member as the piston moves through a final predetermined range of movement toward said one closure member.

11. A hydraulic shock absorber comprising in combination, a fluid reservoir, a cylinder having end closure members, a piston in the cylinder having valved passages providing for the transfer of fluid from one side of the piston to the other as the piston is reciprocated, a rod extending through one of the closure members and secured to the piston, valved passages in the other of said closure members providing for a substantially free flow of fluid from the reservoir into the cylinder and restricted flow of fluid from the cylinder into the reservoir in response to piston reciprocation, said other closure member having a cylindrical extension fitting and projecting into the cylinder a predetermined distance, the inside diameter of said extension being predeterminately less than the cylinder, and means for obtaining limited zones of increased fluid flow control as the piston approaches either extremity of its strokes in the cylinder, said means comprising a shut-off collar movably carried by the said one closure member and engageable by the piston for closing the fluid passages therein which are normally active as the piston moves toward said one closure member and an orifice leading into one of said closed passages and by-passing the shut-off collar for effecting a substantially restricted flow through the piston as it moves through the limited zone approaching said one closure member, the means for increasing the restriction to fluid flow through the piston during the movement of the piston through the limited zone approaching the said other closure member comprising a piston portion slidably received by the cylindrical extension on said other closure member to form a fluid trapping chamber from which fluid is discharged only through a restricting orifice connecting said chamber with one of the valved passages leading to the reservoir.

12. A hydraulic shock absorber comprising in combination, a fluid reservoir, a cylinder having end closure members, one of which has valved passages, certain of which permit a substantially free flow of fluid from the reservoir into the cylinder as the piston moves away from said member and another of which permits a restricted fluid flow from the cylinder into the reservoir as the piston moves toward said one closure member, a valved piston in said cylinder through which a controlled flow of fluid may pass in either direction as the piston is reciprocated by a rod attached thereto and extending through the other closure member, means engaged by the piston as it moves through a predetermined final range of movement toward said other closure member for closing certain piston passages to render them ineffective, a fluid restricting orifice in the piston rendered effective solely to establish a restricted fluid flow into and through one of said passages when closed by said means, disc means on the piston slidably received by the said one closure member as said piston moves through a final predetermined range of movement toward said one closure member, said disc means and closure member cooperating to form a fluid trapping chamber from which fluid may be exhausted only through an orifice of substantial fluid flow restriction, into one of the valved passages in said member.

13. A shock absorber in accordance with claim 12 in which, however, said disc means is an apertured valve yieldably urged against the piston to seal the said fluid trapping chamber as the piston moves to exert pressure upon the fluid in said chamber, said disc means being moved from engagement with the piston to provide communication between said chamber and the fluid flow passages in the piston as said piston is moved to withdraw said disc means from the said one closure member.

14. A shock absorber in accordance with claim 12, in which, however, the disc means is a valve yieldably urged against the end of the piston, and the fluid displacement of the fluid trapping chamber and the cylinder chamber containing the piston rod are substantially equal per unit of piston movement out of embracement by the said one closure member.

15. A hydraulic shock absorber comprising in combination, a fluid reservoir, a cylinder having end closure members, one of which has passages connecting the reservoir and cylinder, a piston in the cylinder having a plurality of fluid passages therethrough, a rod extending through the other of said closure members and secured to the piston for reciprocating it, pressure relief valves yieldably urged upon the piston, one valve controlling the flow of fluid through certain piston passages as the piston is moved toward said one closure member and another valve controlling the flow of fluid through the remaining piston passages as the piston moves toward said other closure member, yieldably extended, telescoping means carried by the said other closure member and slidably embracing the piston rod, said means being engageable by the piston during a final predetermined range of piston movement for closing the entrance ends of the piston passages controlled by said other pressure relief valve a constantly open fluid flow restricting orifice in the piston, operative to by-pass the closed entrance end of one of said passages, a valve urged upon said one closure member and operative to effect a substantially unrestricted fluid flow from the reservoir, through certain of the passages in said one member, into the cylinder as the piston moves away from said one member, a pressure relief valve in another passage in said one member, operative to effect a restricted fluid flow from the cylinder into the reservoir as the piston moves toward said one closure member, a constantly open fluid restricting orifice connecting the cylinder with said pressure relief valve containing passage, and means provided on the piston, operative to cooperate with the said one closure member during a final range of piston movement toward said one member to form a fluid trapping chamber from which fluid may be exhausted only through the orifice in said one member.

16. A hydraulic shock absorber comprising in combination, a cylinder, a reservoir, a valved piston in the cylinder, a closure member at one end of the cylinder, having passages providing communication between the reservoir and cylinder, a valve for certain of said passages, operative to permit restricted fluid flow from the cylinder into the reservoir, another valve for the other of said passages, operative to permit a substantially unrestricted fluid flow from the reservoir into the cylinder, an orifice in the closure member constantly connecting the cylinder with said certain passages, a cylindrical extension on the closure member fitting and extending into the cylinder a predetermined length, said extension having slots forming ports of the said certain passages, and a piston extension slidably fitting into said cylindrical extension and forming a fluid trapping chamber operative to increase restriction to fluid flow within the shock absorber as the piston extension moves in either direction within the closure member extension.

EDWIN F. ROSSMAN.

REFERENCES CITED

The following references are of record in the file of this patent:

UNITED STATES PATENTS

| Number | Name | Date |
|---|---|---|
| 2,148,839 | Rossman et al. | Feb. 28, 1939 |
| 2,507,266 | Patriquin | May 9, 1950 |
| 2,527,034 | Rossman | Oct. 24, 1950 |